3,364,208
16α,17α-DISUBSTITUTED SILYLDIOXY
DERIVATIVES OF STEROIDS
John H. Fried, Palo Alto, Calif., assignor to Syntex
Corporation, Panama, Panama, a corporation of
Panama
No Drawing. Filed Sept. 2, 1966, Ser. No. 576,824
15 Claims. (Cl. 260—239.55)

This invention relates to novel cyclopentanophenanthrene derivatives and a process for their preparation.

More specifically this invention pertains to disubstituted silyldioxy steroids and preparations thereof.

In particular, this invention appertains to the novel steroids which can be illustrated by the following formula:

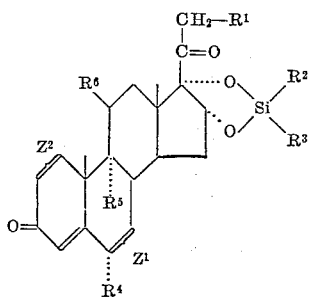

wherein $R^1$ is hydrogen, hydroxy, fluoro, or hydrocarbon carboxylic acyloxy; $R^2$ is lower alkyl or phenyl; $R^3$ is lower alkyl or phenyl; $R^4$ is hydrogen or fluoro; $R^5$ is hydrogen, fluoro or chloro; $R^6$ is chloro or hydroxy, $R^5$ being chloro when $R^6$ is chloro; $Z^1$ is a carbon-carbon single bond or a carbon-carbon double bond; and $Z^2$ is a carbon-carbon single bond or a carbon-carbon double bond. In the foregoing, Si is a silicon atom.

The lower alkyl groups of the compounds of the present invention will contain less than 6 carbon atoms and may be of a straight or branched chain structure and this structure may be saturated or unsaturated.

Typical lower alkyls include methyl, ethyl, isopropyl, and the like.

The hydrocarbon carboxylic acyloxy groups of the compounds of the present invention contain less than 12 carbon atoms and are of a straight, branched, cyclic or cyclic or cyclic-aliphatic chain structure. This structure may be saturated, unsaturated, or aromatic and optionally substituted by functional groups, such as hydroxy, alkoxy containing up to 5 carbon atoms, acyloxy containing up to 12 carbon atoms, nitro, amino, halogeno, and the like. Typical esters thus include acetate, propionate, caproate, enanthate, benzoate, trimethylacetate, t-butylacetate, phenoxyacetate, cyclopentylpropionate, aminoacetate, β-chloropropionate, adamantoate, and the like. The compounds of the present invention are effective anti-inflammatory agents, either by oral application or topical application. They are used to combat inflammation associated with allergic diseases, collagen and musculoskeletal diseases, diseases of the skin and so forth. An oral dosage in the range of about 0.001 mg. to about 10 mg. per kilogram of body weight is usually employed. Topically, the compounds can be applied as powders, creams, ointments, non-aqueous solutions, aqueous solutions, aerosols, and so forth, containing about 0.001% to about 10.0% of the steroid with the remainder being an inert vehicle or combinations of vehicles.

The compounds of the present invention are presented by treating a 16α,17α-dihydroxypregnane, which may be optionally substituted as herein described, with at least a molar equivalent, preferably at least a 0.05 molar excess of a dichloro-disubstituted silane and a base. The silanes are substituted with alkyl groups, aryl groups, or both; for example, typical dichloro-disubstituted silanes include dichlorodimethylsilane, dichlorodiethylsilane, dichloromethylphenylsilane, dichlorodiphenylsilane, etc., but dichlorodimethylsilane is preferred. Any base that is capable of reacting with hydrogen chloride may be used, such as triethylamine, dimethylamine, pyridine, quinoline, potassium carbonate, etc. The process is carried out in sufficient amounts of a non-aqueous inert organic solvent so as to allow the steroid, the dichloro-disubstituted silane, and the base to be susbtantially in solution. Suitable solvents include benzene, dioxane, heptane, diglyme, diethyl ether, etc. The process is carried out under dry conditions at temperatures ranging from about 0° C. to about 60° C., preferably around 25° C., for a reasonable period of time which ranges from about four hours or less to 48 hours or more. The mixture may be stirred during this period, if desired.

At the completion of the process, the product is isolated and purified by any suitable, conventional technique. For example, the reaction mixture is reduced to dryness under vacuum, the remaining material is dissolved in an inert organic solvent that is nonmissible with water, such as diethyl ether, and washed with several portions of 2 N hydrochloric acid, then with several portions of water, dried and evaporated to dryness under vacuum. The steroid product can be recrystallized from acetone:hexane, if desired.

An alternative procedure for preparing these novel compounds is practiced by treating any 16α,17α-dihydroxypregnane, which may be optionally substituted at other positions as herein described, with at least a molar equivalent, preferably with at least a 0.05 molar excess, of a diacetoxyphenylsilane, or a diacetoxydialkylsilane, such as diacetoxydimethylsilane, diacetoxydibutylsilane, and the like. Larger or smaller excesses of the substituted silane are also practical. The process is carried out in a non-aqueous inert, organic solvent, such as benzene, tetrahydrofuran, dioxane, diglyme, diethyl ether, etc., at temperatures ranging from about 0° C. to 100° C. or more, preferably at 60° C. The reactants are allowed to stand under dry conditions for a period of time that ranges from about 4 hours to about 48 hours. Preferably, the mixture is stirred or agitated during the reaction period.

At the completion of the process, the product can be isolated by conventional techniques. For instance, the mixture can be evaporated to dryness under reduced pressure and the material remaining can be dissolved in an inert organic solvent, immiscible with water. The mixture is washed with several portions of water, dried and reduced to dryness under reduced pressure. The steroid product may be recrystallized from acetone:hexane, if desired.

It is preferable to protect the 21-hydroxy group during the above processes with an ester group and then hydrolyze the ester group back to a free hydroxy group after the process, if a free 21-hydroxy group is desired.

In order that those skilled in the art will more fully understand the present invention, the following examples are included for purposes of illustration. In no way, however, should these examples be construed as limitations on the scope thereof.

Example I

To a solution consisting of 4.47 g. (0.01 mole) of 6α,9α-difluoro-11β,16α,17α-trihydroxy-21-acetoxypregna-1,4-diene-3,20-dione, 1.6 g. (0.02 mole) of pyridine, 50 ml. of dry benzene, and 2.58 g. (0.02 mole) of dichlorodimethylsilane are added. The mixture is stirred for 24 hours under dry conditions while maintaining the temperature between 20 and 22° C. The reaction mixture is then reduced to dryness under reduced pressure. The residue remaining is dissolved in diethyl ether and washed several times with water. After the ether solution is dried, the ether is evaporated off yielding 6α,9α-difluoro-11β-hydroxy-16α,17α-dimethylsilyldioxy-21-acetoxypregna-1,4-diene-3,20-dione.

Example II

Four hundred and thirty-one milligrams (1.0 mmole) of 6α,9α,21-trifluoro-11β,16α,17α - trihydroxypregna - 1,4-diene-3,20-dione are placed in a solution of 10 ml. of tetrahydrofuran and 83 mg. (1.05 mmoles) of pyridine. One hundred and thirty-six milligrams (1.06 mmoles) of dichlorodimethylsilane are added to the above mixture, the mixture is well stirred and then allowed to stand at 21° C. for two days. The product is isolated in the same manner as described in Example I. The final product is recrystallized from acetone:hexane to yield 6α,9α,21-trifluoro-11β-hydroxy-16α,17α-dimethylsilyldioxypregna-1,4-diene-3,20-dione.

Example III

Example I is repeated except dichlorodimethylsilane is replaced with 2.78 g. of dichlorodiphenylsilane, the final product thus being 6α,9α-difluoro-11β-hydroxy-16α,17α-diphenylsilyldioxy-21-acetoxypregna-1,4-diene-3,20-dione.

Example IV

By following Example I's procedure and replacing dichlorodimethylsilane with 1.73 g. of dichlorodiethylsilane and 6α,9α-difluoro-11β,16α,17α-trihydroxy-21 - acetoxypregna-1,4-diene-3,20-dione with 3.70 g. of 6α-fluoro-11β,16α,17α-trihydroxypregna-1,4,6-triene - 3,20 - dione, 6α-fluoro-11β-hydroxy-16α,17α-diethylsilyldioxypregna-1,4,6-triene-3,20-dione is produced.

Example V

Forty-four grams of 6α-fluoro-11β,16α,17α-trihydroxy-21-acetoxypregn-4-ene-3,20-dione, 71 ml. of quinoline, 500 ml. of xylene, and 85 g. of dichloromethylphenylsilane are mixed together. The mixture is vigorously stirred under dry conditions for 12 hours at 30° C. The mixture is then washed with several portions of 2 N hydrochloric acid, then with several portions of water. The mixture is reduced to dryness under reduced pressure after being dried. The resulting 6α-fluoro-11β-hydroxy-16α,17α - methylphenylsilyldioxy-21-acetoxypregn-4-ene-3,20 - dione is recrystallized from methanol:water.

Example VI

To a solution consisting of 458 g. (1.0 mole) of 6α,9α-difluoro-11β,16α,17α-trihydroxy - 21 - acetoxypregna-1,4-diene-3,20-dione and 4 l. of pyridine, 194 g. (1.1 moles) of diacetoxydimethylsilane are added. The mixture is heated to 60° C. and stirred for 24 hours under dry conditions. The mixture is then cooled and evaporated to dryness. The material remaining is dissolved in benzene, washed with several portions of aqueous 1.0 N potassium bicarbonate and then with water to neutrality. The benzene is evaporated off under reduced pressure, after it is dried, to yield 6α,9α-difluoro-11β-hydroxy-16α,17α - dimethylsilyldioxy-21-acetoxypregna-1,4-diene-3,20-dione.

Example VII

By repeating the procedure of Example VI and replacing the diacetoxydimethylsilane with 225 g. of diacetoxydiethylsilane, 6α,9α-difluoro-11β-hydroxy-16α,17α-diethylsilyldioxy-21-acetoxypregna-1,4-diene-3,20 - dione is produced.

Example VIII

Forty-four grams (0.1 mole) of 9α-fluoro-11β,16α,17α-trihydroxy-21-acetoxypregna-1,4-diene-3,20-dione and 90 g. (0.3 mole) of diacetoxydiphenylsilane are added to a solution comprised of 500 ml of dry benzene and 500 ml. of dry pyridine. The mixture is refluxed for 48 hours under dry conditions. The mixture is cooled and washed with several large portions of water to neutrality. After the mixture is dried, it is reduced to dryness to yield 9α-fluoro-11β-hydroxy-16α,17α-diphenylsilyldioxy - 21 - acetoxypregna-1,4-diene-3,20-dione.

Example IX

By replacing diacetoxydiphenylsilane with 53 g. of diacetoxydimethylsilane, in the above procedure, 9α-fluoro-11β-hydroxy-16α,17α-dimethylsilyldioxy - 21 - acetoxypregna-1,4-diene-3,20-dione is produced.

Example X

Compounds in column II are produced from the respective steroids in column I by following the procedure of either Example I, II, VI, or IX.

| I | II |
|---|---|
| 11β,16α,17α-trihydroxy-21-acetoxypregn-4-ene-3,20-dione. | 11β-hydroxy-16α,17α-dimethylsilyldioxy-21-acetoxypregn-4-ene-3,20-dione. |
| 11β,16α,17α-trihydroxy-21-acetoxypregna-1,4-diene-3,20-dione. | 11β-hydroxy-16α,17α-dimethylsilyldioxy-21-acetoxypregna-1,4-diene-3,20-dione. |
| 6α-fluoro-11β,16α,17α-trihydroxy-21-acetoxypregna-1,4-diene-3,20-dione. | 6α-fluoro-11β-hydroxy-16α,17α-dimethylsilyldioxy-21-acetoxypregna-1,4-diene-3,20-dione. |
| 6α-fluoro-11β,16α,17α-trihydroxy-21-acetoxypregna-4,6-diene-3,20-dione. | 6α-fluoro-11β-hydroxy-16α,17α-dimethylsilyldioxy-21-acetoxypregna-4,6-diene-3,20-dione. |
| 6α-fluoro-11β,16α,17α-trihydroxy-21-acetoxypregna-1,4,6-triene-3,20-dione. | 6α-fluoro-11β-hydroxy-16α,17α-dimethylsilyldioxy-21-acetoxypregna-1,4,6-triene-3,20-dione. |
| 9α-fluoro-11β,16α,17α-trihydroxy-21-acetoxypregn-4-ene-3,20-dione. | 9α-fluoro-11β-hydroxy-16α,17α-dimethylsilyldioxy-21-acetoxypregn-4-ene-3,20-dione. |
| 9α-fluoro-11β,16α,17α-trihydroxy-21-acetoxypregna-4,6-diene-3,20-dione. | 9α-fluoro-11β-hydroxy-16α,17α-dimethylsilyldioxy-21-acetoxypregna-4,6-diene-3,20-dione. |
| 9α-fluoro-11β,16α,17α-trihydroxy-21-acetoxypregna-1,4,6-triene-3,20-dione. | 9α-fluoro-11β-hydroxy-16α,17α-dimethylsilyldioxy-21-acetoxypregna-1,4,6-triene-3,20-dione. |
| 6α,9α-difluoro-11β,16α,17α-trihydroxy-21-acetoxypregn-4-ene-3,20-dione. | 6α,9α-difluoro-11β-hydroxy-16α,17α-dimethylsilyldioxy-21-acetoxypregn-4-ene-3,20-dione. |
| 6α,9α-difluoro-11β,16α,17α-trihydroxy-21-acetoxypregna-4,6-diene-3,20-dione. | 6α,9α-difluoro-11β-hydroxy-16α,17α-dimethylsilyldioxy-21-acetoxypregna-4,6-diene-3,20-dione. |
| 6α,9α-difluoro-11β,16α,17α-trihydroxy-21-acetoxypregna-1,4,6-triene-3,20-dione. | 6α,9α-difluoro-11β-hydroxy-16α,17α-dimethylsilyldioxy-21-acetoxypregna-1,4,6-triene-3,20-dione. |
| 6α,21-difluoro-11β,16α17α-trihydroxypregn-4-ene-3,20-dione. | 6α,21-difluoro-11β-hydroxy-16α,17α-dimethylsilyldioxypregna-4-ene-3,20-dione. |
| 6α,21-difluoro-11β,16α,17α-trihydroxypregna-1,4-diene-3,20-dione. | 6α,21-difluoro-11β-hydroxy-16α,17α-dimethylsilyldioxypregna-1,4-diene-3,30-dione. |
| 6α,21-difluoro-11β,16α,17α-trihydroxypregna-4,6-diene-3,20-dione. | 6α,21-difluoro-11β-hydroxy-16α,17α-dimethylsilyldioxypregna-4,6-diene-3,20-dione. |
| 6α,21-difluoro-11β,16α,17α-trihydroxypregna-1,4,6-triene-3,20-dione. | 6α,21-difluoro-11β-hydroxy-16α,17α-dimethylsilyldioxypregna-1,4,6-triene-3,20-dione. |
| 9α,21-difluoro-11β,16α,17α-trihydroxypregn-4-ene-3,20-dione. | 9α,21-difluoro-11β-hydroxy-16α,17α-dimethylsilyldioxypregna-4-ene-3,20-dione. |
| 9α,21-difluoro-11β,16α,17α-trihydroxypregna-1,4-diene-3,20-dione. | 9α,21-difluoro-11β-hydroxy-16α,17α-dimethylsilyldioxypregna-1,4-diene-3,20-dione. |
| 9α,21-difluoro-11β,16α,17α-trihydroxypregna-4,6-diene-3,20-dione. | 9α,21-difluoro-11β-hydroxy-16α,17α-dimethylsilyldioxypregna-4,6-diene-3,20-dione. |
| 9α,21-difluoro-11β,16α,17α-trihydroxypregna-1,4,6-triene-3,20-dione. | 9α,21-difluoro-11β-hydroxy-16α,17α-dimethylsilyldioxypregna-1,4,6-triene-3,20-dione. |
| 6α,9α,21-trifluoro-11β,16α,17α-trihydroxypregn-4-ene-3,20-dione. | 6α,9α,21-trifluoro-11β-hydroxy-16α,17α-dimethylsilyldioxypregn-4-ene-3,20-dione. |
| 6α,9α,21-trifluoro-11β,16α,17α-trihydroxypregna-4,6-diene-3,20-dione. | 6α,9α,21-trifluoro-11β-hydroxy-16α,17α-dimethylsilyldioxypregna-4,6-diene-3,20-dione. |
| 6α,9α,21-trifluoro-11β,16α,17α-trihydroxypregna-1,4,6-triene-3,20-dione. | 6α,9α,21-trifluoro-11β-hydroxy-16α,17α-dimethylsilyldioxypregna-1,4,6-triene-3,20-dione. |

| I | II |
|---|---|
| 6α-fluoro-11β,16α,17α-tri-hydroxypregn-4-ene-3,20-dione. | 6α-fluoro-11β-hydroxy-16α,17α-dimethylsilyldioxypregn-4-ene-3,20-dione. |
| 6α-fluoro-11β,16α,17α-tri-hydroxypregna-1,4-diene-3,20-dione. | 6α-fluoro-11β-hydroxy-16α,17α-dimethylsilyldioxypregna-1,4-diene-3,20-dione. |
| 6α-fluoro-11β,16α,17α-tri-hydroxypregna-4,6-diene-3,20-dione. | 6α-fluoro-11β-hydroxy-16α,17α-dimethylsilyldioxypregna-4,6-diene-3,20-dione. |
| 9α-fluoro-11β,16α,17α-tri-hydroxypregn-4-ene-3,20-dione. | 9α-fluoro-11β-hydroxy-16,17α-dimethylsilyldioxypregn-4-ene-3,20-dione. |
| 9α-fluoro-11β,16α,17α-tri-hydroxypregna-1,4-diene-3,20-dione. | 9α-fluoro-11β-hydroxy-16α,17α-dimethylsilyldioxypregna-1,4-diene-3,20-dione. |
| 9α-fluoro-11β,16α,17α-tri-hydroxypregna-4,6-diene-3,20-dione. | 9α-fluoro-11β-hydroxy-16α,17α-dimethylsilyldioxypregna-4,6-diene-3,20-dione. |
| 9α-fluoro-11β,16α,17α-tri-hydroxypregna-1,4,6-triene-3,20-dione. | 9α-fluoro-11β-hydroxy-16α,17α-dimethylsilyldioxypregna-1,4,6-triene-3,20-dione. |
| 6α,9α-difluoro-11β,16α,17α-tri-hydroxypregn-4-ene-3,20-dione. | 6α,9α-difluoro-11β-hydroxy-16α,17α-dimethylsilyldioxypregn-4-ene-3,20-dione. |
| 6α,9α-difluoro-11β,16α,17α-tri-hydroxypregna-1,4-diene-3,20-dione. | 6α,9α-difluoro-11β-hydroxy-16α,17α-dimethylsilyldioxypregna-1,4-diene-3,20-dione. |
| 6α,9α-difluoro-11β,16α,17α-tri-hydroxypregna-4,6-diene-3,20-dione. | 6α,9α-difluoro-11β-hydroxy-16α,17α-dimethylsilyldioxypregna-4,6-diene-3,20-dione. |
| 6α,9α-difluoro-11β,16α,17α-tri-hydroxypregna-1,4,6-triene-3,20-dione. | 6α,9α-difluoro-11β-hydroxy-16α,17α-dimethylsilyldioxypregna-1,4,6-triene-3,20-dione. |
| 9α,11β-dichloro-16α,17α-dihydroxy-21-acetoxypregna-1,4-diene-3,20-dione. | 9α,11β-dichloro-16α,17α-dimethylsilyldioxy-21-acetoxypregna-1,4-diene-3,20-dione. |
| 6,9α,11β-trichloro-16α,17α-dihydroxy-21-fluoropregna-1,4,6-triene-3,20-dione. | 6,9α,11β-trichloro-16α,17α-dimethylsilyldioxy-21-fluoropregna-1,4,6-triene-3,20-dione. |
| 9α,11β-dichloro-16α,17α-dihydroxy-21-acetoxypregn-4-ene-3,20-dione. | 9α,11β-dichloro-16α,17α-dimethylsilyldioxy-21-acetoxypregn-4-ene-3,20-dione. |
| 6α-fluoro-9α,11β-dichloro-16α,17α-dihydroxy-21-acetoxypregen-4-ene-3,20-dione. | 6α-fluoro-9α,11β-dichloro-16α,17α-dimethylsilyldioxy-21-acetoxypregn-4-ene-3,20-dione. |
| 6α-fluoro-9α,11β-dichloro-16α,17α-dihydroxy-21-acetoxypregna-1,4-diene-3,20-dione. | 6α-fluoro-9α,11β-dichloro-16α,17α-dimethylsilyldioxy-21-acetoxypregna-1,4-diene-3,20-dione. |
| 6-methyl-9α,11β-dichloro-16α,17α-dihydroxy-21-fluoropregna-4,6-diene-3,20-dione. | 6-methyl-9α,11β-dichloro-16α,17α-dimethylsilyldioxy-21-fluoropregna-4,6-diene-3,20-dione. |

By using the steroids of column I in the procedures of either Example III or VIII, the corresponding 16α,17α-diphenylsilyldioxy steroids are produced. Thus, for example, by using either procedure, 6α,9α,21-trifluoro-11β-hydroxy-16α,17α - diphenylsilyldioxy-1,4-diene-3,20-dione is produced from 6α,9α,21-trifluoro-11β,16α,17α-trihydroxy-pregna-1,4-diene-3,20-dione.

By using the steroids of column I in the procedures of either Example IV or VII, the corresponding 16α,17α-diethylsilyldioxy steroids are produced. Thus, for example, by using either procedure, 6α-fluoro-11β-hydroxy-16α,17α-diethylsilyldioxy-21-acetoxypregna-4,6-diene-3,20-dione is produced from 6α - fluoro-11β,16α,17α - trihydroxy - 21-acetoxypregna-4,6-diene-3,20-dione.

*Example XI*

A suspension of 1 g. of 6α,9α-difluoro-11β-hydroxy-16α,17α - dimethylsilyldioxy-21-acetoxypregna-1,4-diene-3,20-dione in 60 ml. of methanol is treated with a solution of 1 g. of potassium carbonate in 6 ml. of water. The mixture is heated at reflux for one hour, cooled in ice and diluted with water. The solid which forms is collected by filtration, washed with water and dried to yield 6α,9α-difluoro - 11β,21 - dihydroxy-16α,17α-dimethylsilyldioxy-pregna-1,4-diene-3,20-dione.

In the same manner, other 16α,17α-disubstituted silyldioxy-21-acyloxy steroids, including all such steroids in the previous examples, can be hydrolyzed to the corresponding 16α,17α-disubstituted silyldioxy-21-hydroxy steroids. For example, by the same procedure, 9α-fluoro-11β - hydroxy - 16α,17α-dimethylsilyldioxy - 21-acetoxy-pregna-1,4-diene-3,20-dione is hydrolyzed to 9α-fluoro-11β,21 - dihydroxy-16α,17α-dimethylsilyldioxypregna-1,4-diene-3,20-dione.

What is claimed is:
1. A compound of the formula:

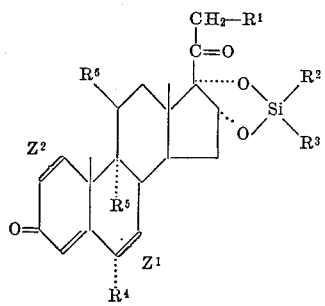

wherein
$R_1$ is hydrogen, hydroxy, fluoro, or a hydrocarbon carboxylic acyloxy group;
$R^2$ is lower alkyl or phenyl;
$R^3$ is lower alkyl or phenyl;
$R^4$ is hydrogen or fluoro;
$R^5$ is hydrogen, fluorine or chloro;
$R^6$ is hydroxy or chloro, $R^5$ being chloro when $R^6$ is chloro;
$Z^1$ is a carbon-carbon single bond or a carbon-carbon double bond; and
$Z^2$ is a carbon-carbon single bond or a carbon-carbon double bond.

2. A compound according to claim 1 wherein
$R^1$ is hydroxy or acetoxy;
$R^2$ and $R^3$ are each methyl;
$R^5$ is hydrogen or fluoro; and
$R^6$ is hydroxy.

3. A compound according to claim 2 wherein
$R^4$ is hydrogen;
$R^5$ is fluoro;
$Z^1$ is a carbon-carbon single bond; and
$Z^2$ is a carbon-carbon double bond.

4. A compound according to claim 2 wherein
$R^4$ is hydrogen;
$R^5$ is fluoro; and
$Z^1$ and $Z^2$ are carbon-carbon single bonds.

5. A compound according to claim 2 wherein
$R^4$ is fluoro;
$R^5$ is hydrogen;
$Z^1$ is a carbon-carbon single bond; and
$Z^2$ is a carbon-carbon double bond.

6. A compound according to claim 2 wherein
$R^4$ is fluoro;
$R^5$ is hydrogen;
$Z^1$ and $Z^2$ are carbon-carbon single bonds.

7. A compound according to claim 2 wherein
$R^4$ and $R^5$ are each fluoro;
$Z^1$ is a carbon-carbon single bond; and
$Z^2$ is a carbon-carbon double bond.

8. A compound according to claim 2 wherein
$R^4$ and $R^5$ are each fluoro; and
$Z^1$ and $Z^2$ are carbon-carbon single bonds.

9. A compound according to claim 2 wherein
$R^4$ and $R^5$ are each fluoro;
$Z^1$ is a carbon-carbon double bond; and
$Z^2$ is a carbon-carbon single bond.

10. A compound according to claim 2 wherein
$R^4$ and $R^5$ are each fluoro; and
$Z^1$ and $Z^2$ are carbon-carbon double bonds.

11. A compound according to claim 1 wherein
$R^1$ is hydroxy or acetoxy;
$R^2$ and $R^3$ are each methyl; and
$R^5$ and $R^6$ are chloro.

12. A compound according to claim 11 wherein
$R^4$ is hydrogen; and
$Z^1$ and $Z^2$ are carbon-carbon single bonds.

13. A compound according to claim 11 wherein
$R^4$ is hydrogen;
$Z^1$ is a carbon-carbon single bond; and
$Z^2$ is a carbon-carbon double bond.

14. A compound according to claim 11 wherein
$R^4$ is fluoro; and
$Z^1$ and $Z^2$ are carbon-carbon single bonds.

15. A compound according to claim 11 wherein
$R^4$ is fluoro;

$Z^1$ is a carbon-carbon double bond; and
$Z^2$ is a carbon-carbon single bond.

References Cited

UNITED STATES PATENTS 2,966,486  12/1960  Smith et al. _____ 260—239.55

ELBERT L. ROBERTS, *Primary Examiner.*